United States Patent [19]
Horne

[11] 4,276,908
[45] Jul. 7, 1981

[54] BONDED THERMOPLASTIC HOSE

[75] Inventor: Shek C. Horne, Reading, Pa.

[73] Assignee: The Polymer Corporation, Reading, Pa.

[21] Appl. No.: 87,730

[22] Filed: Oct. 24, 1979

Related U.S. Application Data

[63] Continuation of Ser. No. 936,871, Aug. 25, 1978, abandoned.

[51] Int. Cl.³ .............................................. F16L 11/08
[52] U.S. Cl. ................................... 138/125; 156/149; 428/36
[58] Field of Search ............... 138/124, 125, 126, 127; 428/36; 156/149

[56] References Cited

U.S. PATENT DOCUMENTS

| | | | |
|---|---|---|---|
| 2,977,839 | 4/1961 | Koch | 138/125 |
| 3,190,315 | 6/1965 | Taylor et al. | 138/127 |
| 3,249,666 | 5/1966 | French | 138/127 |
| 3,500,867 | 3/1970 | Elson | 138/125 |
| 3,886,980 | 6/1975 | Elson | 138/127 |
| 3,948,293 | 6/1976 | Bixby | 138/126 |
| 3,988,189 | 10/1976 | Sullivan | 138/127 |

Primary Examiner—William R. Dixon, Jr.
Attorney, Agent, or Firm—Richard O. Church

[57] ABSTRACT

A thermoplastic hose is disclosed in which a reinforcement layer is made fom a combination of yarns and monofilaments to provide stereo interstices where mechanical bonds between the reinforcement and its adjacent element of the hose can be established.

8 Claims, 1 Drawing Figure

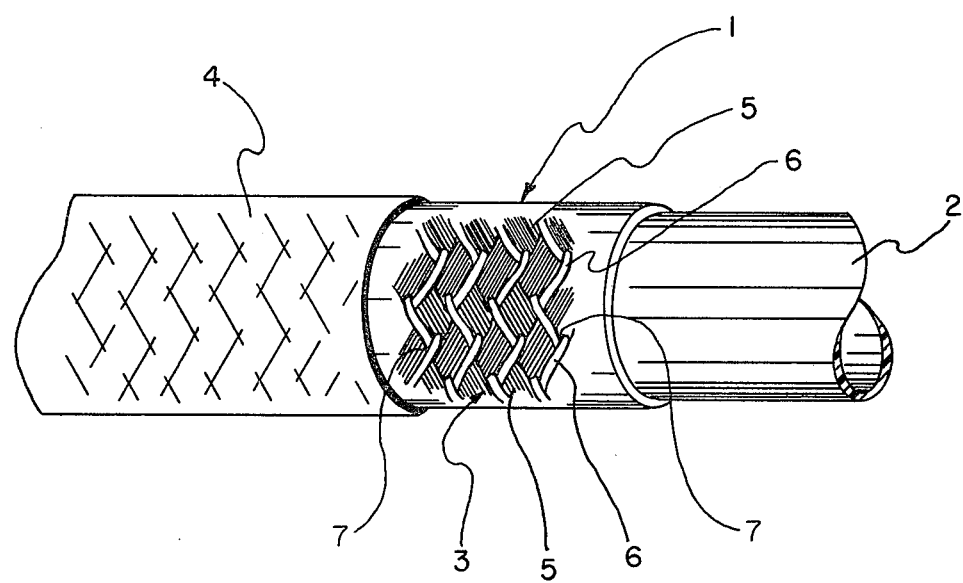

BONDED THERMOPLASTIC HOSE

This is a continuation of application Ser. No. 936,871, filed Aug. 25, 1978, abandoned.

DEFINITIONS

The term "tube" as used herein refers to the inner tubular component of a hose that serves as an impervious conduit for the transmission of fluids.

The term "reinforcement" as used herein refers to one or more plies of high tenacity yarns or monofilaments that are applied in tensioned relationship (as by spiral wrapping, braiding, knitting or the like) over the tube to increase the burst strength and kink resistance of the tube.

The term "cover" as used herein refers to a continuous protective layer of polymeric material that envelopes the reinforcement.

The term "hose" as used herein refers to a composite structure adapted for the transmission of fluids under pressure, which includes a tube, reinforcement, and a cover.

The term "bonding" as used herein refers to methods for adhering the several components of the hose to each other as through the use of heat, solvents, adhesives, or mechanical means.

BACKGROUND OF THE INVENTION

1. Field of the Invention

This invention relates to high pressure reinforced flexible hose made from synthetic thermoplastic materials. More particularly, this invention is concerned with a thermoplastic hose in which bonding between the reinforcement and an adjacent element of the hose is obtained by using a mixture of yarn and monofilament for the reinforcement.

2. Description of the Prior Art

In the manufacture of high performance hose it is important that the cover be bonded to the reinforcement and the reinforcement to the tube. This bonding contributes to the overall physical properties of the hose, improves the kink resistance, and prevents separation and draw back of the reinforcement when the hose is cut to length and fittings are attached. It is also important, to protect the reinforcement yarns from being torn or cut, that the protective cover be securely bonded to the reinforcement.

One of the more common methods that has been used to bond the reinforcement to an adjacent element of a hose is by solvating either the surface of the reinforcement or the surface of the adjacent element before they are brought into contacting relationship with each other. Solvent bonding works well in many circumstances but necessarily depends upon the availability of a solvent that is not too expensive, one that will solvate both contacting surfaces if they are made from different materials, and, from a manufacturing viewpoint, one that is not toxic and does not require special protection for production workers.

Adhesives are sometimes used as a bonding material but, in many applications, even when good initial adhesion is obtained, the bonds tend to weaken after the hose had been pressure pulsed a number of times.

Heat fusion techniques may provide good bonds, but they are seldom useful since heat softenable synthetic yarns may suffer a significant loss in tensile strength when exposed to temperatures at or near their melting points.

Another approach to the bonding problem is to make the reinforcement in the form of a comparatively open meshed braid that has open areas into which melted cover or tube material can be extruded and establish mechanical bonds when cooled. This technique may work well for locking the reinforcement in place, but an open braid markedly decreases the burst strength of a hose.

Accordingly it is an object of this invention to improve the bond strength between the reinforcement and adjacent components of a high pressure hose.

A more specific object of this invention is to improve the bond strength between the cover and the braided reinforcement of a hose without loss of burst strength.

Breifly these and other objects of this invention are achieved by reinforcing hose with a combination of yarns and monofilaments to create stereo interstices into which molten tube or cover material may be flowed to establish mechanical bonds.

The reinforcement materials which with this invention are principally concerned, are those high tenacity yarns which are difficult to bond to the other elements of a thermoplastic hose using solvent bonding techniques. These materials include thermoplastics ranging from the polyesters which are difficult to solvate to polyaramides which are essentially insoluble. In addition to synthetic polymeric reinforcing materials, the invention contemplates the use of other kinds of high tenacity reinforcing materials including yarns and monofilaments made from metal, glass and carbon fibers.

Polyester yarns are particularly useful in making hose in accordance with this invention and, for convenience, the following description is restricted to polyester yarns and monofilaments although it is not intended that the invention should be so limited.

High tenacity polyester yarns are commonly prepared by the polymeric reaction of terephthalic acid (or dimethyl phthalate) and ethylene glycol and are sold, for example, by duPont under its trademark Dacron ® and ICI under its trademark Terylene ®. The polyester yarns have certain properties which make them particularly suitable for use as hose reinforcement. For example, as compared with nylon, also an excellent high tenacity fiber, the polyesters are somewhat less expensive, they have higher tensile strength, they have lower elongation, and they do not absorb as much moisture. The higher strength is advantageous in that less yarn is required to obtain a given burst strength and this not only saves money but the result is a lighter, more compact, and more kink resistant hose. The low moisture absorption reduces the change in electrical conductivity which is significant in designing a nonconductive hose. The lower elongation provided by the polyester reinforcement is desirable since the hose will have a lower volumetric expansion when pressurized. Also, since a lesser weight of reinforcement is needed, the reinforcement can be packed closer to the center of the hose, thus yielding slightly higher burst pressures.

As previously mentioned, it is difficult to use solvent bonding techniques with polyesters unless somewhat obnoxious or toxic solvents are used at elevated temperatures. In the practice of this invention, mechanical bonds are formed between the polyester reinforcement and other elements of the hose by preparing the reinforcement from a mixture of yarns and monofilaments which develop stereo interstices into which the tube or cover material may be flowed to develop mechanical bonds. The reason that these interstices are developed is due to the fact that when a yarn reinforcement is pulled down, the individual fibers of the yarn are flattened out over the surface to which they are being applied (i.e., either the surface of tube or a previously applied layer of reinforcement). On the other hand, monofilaments retain much of their round cross-sectional configuration and stand away from the surface to which they are applied. For example, when the reinforcement is being applied in the form of a braid, the geometry of the intersection of the substantially circular monofilaments result in the development of small areas or pockets into which the tube or cover material may be flowed. This result takes place even though a high coverage, compact braid is applied and it is to be distinguished from the open areas that result when a comparatively loose braid is applied over a tube. Similar stereo interstices are obtained at the points of intersection of monofilaments when the reinforcement is applied as a plurality of spiral wraps of opposite hand.

Since in the practice of this invention, the reinforcement is closely packed and there is very little, if any, measurable loss in the burst strength of the hose.

IN THE DRAWINGS

The invention can be better understood in connection with the FIGURE which is a schematic view, partially cut away, of a reinforced hose made in accordance with this invention.

The hose 1 shown in the drawing is comprised of three functional elements including a tube 2, a braided reinforcement 3 and an outer protective cover 4. The braid 3 is made from a combination of yarns 5 and monofilaments 6. The yarns 5 when braided onto the surface of the tube 2 are pulled down into a flat configuration flat against the surface of the tube but the monofilaments 6 retain a substantially circular cross section which stands away from the surface of the tube 2. This results in the formation of stereo interstices primarily at the intersections 7 of the monofilaments.

EXAMPLE

A tube having an interior diameter of about ⅜ inch and a wall thickness of about 0.056 was extruded and two plies of a 5500 denier polyester (Dacron) yarn were braided over the tube using a 24 carrier braider to apply, in two passes through the braider, two layers of braid. A thermoplastic polyurethane cover was extruded over the second layer of the braided reinforcement and, on pressure testing, the hose was found to have a burst pressure of about 10,000 psi. The bonding between the cover and the outer braid as reflected by a cover peel test was about 6 to 8 pounds per linear inch.

Another hose was prepared identical to the above hose except when the second braided reinforcement was applied, three of both upper and lower carriers of the outer braid were wound with 3140 denier high bulk yarn of the type having staple imbedded in a continuous filament (Multiplex ®) yarn sold by duPont) and the other nine of both the upper and lower carriers were wound with the same 5500 denier polyester. The same cover material was extruded over the second braid layer. The burst pressure of this hose was found to be substantially the same as the first, i.e. 9500 to 10,000 psi, but the bond strength between the cover and the braid increased to about 12 to 19 pounds per linear inch. Thus while the burst strength of the hose was not substantially diminished, the bond strength was substantially improved.

The regular yarn of the outer braid layer can be mixed with ends of monofilament in various combinations depending upon how many carriers of the high tenacity polyester yarns are replaced with the monofilament. In a system such as described above for a ⅜ ID hose, one 3140 denier monofilament in every 3 or 4 carriers of 5500 denier high tenacity polyester yarn will produce excellent hose properties, including the required burst pressure, competitive cost, and good cover smoothness. It can be understood that the bond strength will be increased when more carriers of monofilament are used but that this increased bond strength will result in some loss of burst strength of the hose. Accordingly, for any given application an appropriate compromise between bond strength and burst strength of the hose must be struck.

In the above example, the technique of this invention was illustrated in establishing bonds between the cover of a hose and the outermost reinforcement layer. It should be noted that the invention applies equally to the attachment of the innermost reinforcement layer to the tube. The essential difference between the two types of bonding operations lies in the fact that when bonding a cover to the tube, the cover material may be melt extruded into the stereo interstices of the reinforcement. On the other hand, when bonding a reinforcement to a tube, mobility of the surface of the tube to permit flow into the stereo interstices of the reinforcement can best be obtained and controlled by solvents. The surface of the tube also may be heated to improve surface mobility.

In the above description of this invention continued reference has been made, for convenience, to monofilament. This is a slight inaccuracy since the ordinary meaning of the term comprehends a single filament. In practice, a monofilament is not essential to achieve the results of this invention provided the reinforcement material functions as a monofilament in the sense that it holds its cross-sectional dimension and does not substantially flatten out when processed in textile machinery. Thus it is known that yarn can be formed by twisting several fibers together which, to superficial inspection, appears to be a monofilament and which, when worked in textile machines will maintain a substantially circular cross section. For this reason it should be understood that while this invention has been discussed above with specific reference to monofilaments it is intended that the term "monofilament" as used in the specification in claims, is meant to include other yarns and fibers that act like monofilaments in the sense that they retain substantial degree of their cross-sectional configuration when processed in textile machines.

I claim:

1. A high pressure thermoplastic hose having a compact high coverage reinforcement, characterized in that the reinforcement is a mixed braid made from (1) yarns which intersect and are interwoven with (2) monofilaments or yarns which remain substantially round in cross section when processed in textile machines, whereby stereo interstices are established at the intersection of the (1) yarns and (2) monofilaments or yarns into which interstices is extruded a portion of the adjacent element of the hose.

2. A hose according to claim 1 wherein the reinforcement yarns are polyester.

3. A method for bonding a high coverage reinforcement to another element of a hose characterized in that stereo interstices forming sites for mechanical bonding are established by making a mixed reinforcement layer from a combination of interwoven and intersecting (1) yarns and (2) monofilaments or yarns which remain substantially round in cross section when processed in textile machines.

4. A method according to claim 3 wherein the combination of (1) yarns and (2) monofilaments or yarns which remain substantially round in cross section are braided over the softened surface of a tube.

5. A method according to claim 3 wherein the mixed reinforcement layer is applied as the outermost reinforcement of a hose and a cover is melt extruded over the outer surface of the mixed reinforcement layer.

6. A method according to claim 4 wherein the surface is heat softened.

7. A method according to claim 4 wherein the surface is softened by a solvent.

8. In the manufacture of thermoplastic hose having a high coverage braided polyester textile reinforcement, a method for obtaining mechanical adhesion between a braided reinforcement layer and the adjacent elements of the hose, which comprises: forming a mixed braided layer from a combination of intersecting and interwoven (1) polyester yarns and (2) monofilaments or yarns that retain a substantially circular cross section after braiding to establish stereo interstices and extruding an adjacent element of the hose into the interstices.

* * * * *